United States Patent
Ashcraft et al.

(10) Patent No.: US 9,986,337 B2
(45) Date of Patent: *May 29, 2018

(54) TRANSMIT AUDIO IN A TARGET SPACE

(71) Applicant: Hewlett-Packard Development Company, L.P., Houston, TX (US)

(72) Inventors: Britt C. Ashcraft, Tomball, TX (US); Eric Chen, Houston, TX (US); Sandie Ning Ning Cheng, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/406,878

(22) Filed: Jan. 16, 2017

(65) Prior Publication Data

US 2017/0127185 A1 May 4, 2017

Related U.S. Application Data

(63) Continuation of application No. 14/119,773, filed as application No. PCT/US2011/044330 on Jul. 18, 2011, now Pat. No. 9,591,402.

(51) Int. Cl.
| | |
|---|---|
| *H04R 5/02* | (2006.01) |
| *H04R 29/00* | (2006.01) |
| *H04R 3/12* | (2006.01) |
| *H04R 1/32* | (2006.01) |
| *H04S 7/00* | (2006.01) |

(52) U.S. Cl.
CPC ............ *H04R 3/12* (2013.01); *H04R 1/323* (2013.01); *H04S 7/302* (2013.01); *H04S 7/305* (2013.01)

(58) Field of Classification Search
CPC .......... H04R 3/12; H04R 1/323; H04S 7/302; H04S 7/305
USPC ................... 381/59, 111, 123, 305
See application file for complete search history.

(56) References Cited

U.S. PATENT DOCUMENTS

| | | |
|---|---|---|
| 5,668,882 A | 9/1997 | Hickman et al. |
| 6,324,052 B1 | 11/2001 | Azima et al. |
| 2004/0165015 A1 | 8/2004 | Blum et al. |
| 2006/0262935 A1 | 11/2006 | Goose et al. |
| 2007/0183618 A1 | 8/2007 | Ishii et al. |
| 2010/0027832 A1 | 2/2010 | Koseki |
| 2010/0329489 A1* | 12/2010 | Karaoguz ............... H04S 7/302 381/307 |
| 2011/0044467 A1 | 2/2011 | Pompei |
| 2011/0058677 A1 | 3/2011 | Choi et al. |
| 2011/0091042 A1 | 4/2011 | Ko et al. |
| 2011/0103614 A1 | 5/2011 | Cheung et al. |

* cited by examiner

*Primary Examiner* — Paul S Kim
(74) *Attorney, Agent, or Firm* — HPI Patent Department

(57) ABSTRACT

Implementations disclosed herein relate to transmitting audio in a target space relative to an electronic device using a directional speaker and non-directional speaker. In one implementation, a directional speaker or non-directional speaker is selected to transmit audio based on a target space for the audio. The audio may then be transmitted from the selected speaker.

20 Claims, 6 Drawing Sheets

TRANSMIT AUDIO IN A TARGET SPACE

CROSS-REFERENCE TO RELATED APPLICATIONS

This is a continuation of U.S. application Ser. No. 14/119,773, filed Nov. 22, 2013, which is a national stage application under 35 U.S.C. § 371 of PCT/US2011/044330, filed Jul. 18, 2011, which are both hereby incorporated by reference in their entirety.

BACKGROUND

An electronic device may include speakers for transmitting audio to an audience. For example, a user may listen to music, a movie, or a presentation from speakers on a laptop or other type of computer. The user may adjust the audio, for example, by changing the volume or by wearing headphones.

BRIEF DESCRIPTION OF THE DRAWINGS

The drawings describe example implementations. The drawings show methods performed in an example order, but the methods may also be performed in other orders. The following detailed description references the drawings, wherein.

DETAILED DESCRIPTION

An electronic device may include speakers for transmitting audio. In some cases, a user may adjust the sound, such as by wearing headphones, attaching additional speakers, or turning up the volume. However, the electronic device itself may not easily adjust to different audio modes tailored to different types of audiences.

To address this issue, in one implementation, an electronic device may include settings for automatically adjusting audio to tailor it to an audience relative position and distance from the electronic device. For example, a user may want the audio to be heard by the user as if he were wearing headphones. The user may later want to use the same electronic device to play music to a large audience.

In one implementation, an electronic device includes a directional speaker and a non-directional speaker. The electronic device may determine an audio configuration to achieve a selected audio mode for transmitting sound within a particular target space. The electronic device may select one or more speakers for achieving the desired result. For example, the electronic device may use the directional speaker for a smaller audio target space and a non-directional speaker for a larger audio target space. The non-directional speaker may also be used where the audio mode functionality is turned off. In some cases, multiple directional speakers may be used where the speakers transmit audio in different directions. An electronic device with multiple audio modes may allow a user to adapt the audio to different uses and audience types more easily.

Figure 1:
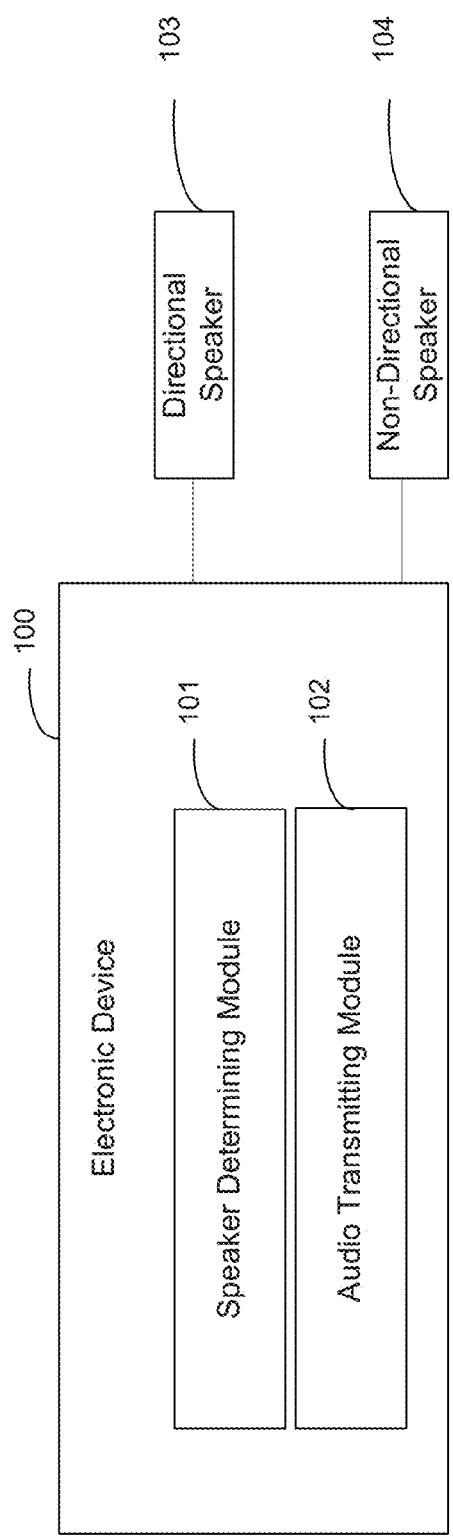
FIG. 1 is a block diagram illustrating one example of an electronic device.

FIG. 1 is a diagram illustrating one example of an electronic device 100. The electronic device 100 may be, for example, a desktop, laptop, or mobile computing device. The electronic device 100 includes a speaker determining module 101, an audio transmitting module 102, a directional speaker 103, and a non-directional speaker 104. In one implementation, the electronic device 100 determines whether to transmit audio from the directional speaker 103 and the non-directional speaker 104 based on a target space for the audio. For example, the directional speaker 103 may be used to transmit audio in a particular target space, and the non-directional speaker 104 may be used for a larger target space or where a particular target space is not selected. In some cases, the distance from which the audio may be heard may also be adjusted. For example, the audio may be adjusted to further change the distance relative to the electronic device 100 from which audio from the directional speaker 103 or non-directional speaker 104 may be heard.

The directional speaker 103 and non-directional speaker 104 may be included within the electronic device 100 or attached externally to the electronic device 100. The directional speaker 103 may be any suitable speaker for transmitting audio in a particular direction. In some cases, the electronic device 100 may include multiple directional speakers where each speaker transmits audio in a different direction from the electronic device 100. The directional speaker 103 may transmit audio such that a person outside of the audio cone created by the directional speaker 103 may be unable to hear the audio. The non-directional speaker 104 may be any suitable speaker for transmitting audio. For example, the non-directional speaker 104 may be a standard speaker that transmits audio generally rather than in a specific direction.

The electronic device may include a processor. The processor may be any suitable processor, such as a central processing unit (CPU), a semiconductor-based microprocessor, or any other device suitable for retrieval and execution of instructions. In one implementation, the electronic device includes logic instead of or in addition to the processor. As an alternative or in addition to fetching, decoding, and executing instructions, the processor may include one or more integrated circuits (ICs) (e.g., an application specific integrated circuit (ASIC)) or other electronic circuits that comprise a plurality of electronic components for performing the functionality described below. In one implementation, the electronic device 100 includes multiple processors. For example, one processor may perform some functionality and another processor may perform other functionality described below. The processor or logic may execute the functionality of the speaker determining module 101 and the audio transmitting module 102.

In one implementation, the speaker determining module 101 and the audio transmitting module 102 include instructions stored in a machine-readable storage medium. The machine-readable storage medium may be any suitable machine readable medium, such as an electronic, magnetic, optical, or other physical storage device that stores executable instructions or other data (e.g., a hard disk drive, random access memory, flash memory, etc.). The machine-readable storage medium may be, for example, a computer readable non-transitory medium. The machine-readable storage medium may include instructions in the speaker determining module 101 and the audio transmitting module 102 executable by a processor.

The speaker determining module 101 may include instructions and/or logic to determine whether to use the directional speaker 103 or the non-directional speaker 104. In some cases, the speaker determining module 101 may further include instructions and/or logic to determine which of several directional speakers or non-directional speakers to use. A processor may determine which speaker to use based on a target space for audio transmitted from the electronic device 100. For example, the directional speaker 103 may be used where audio is desired in a more specific area such that it is limited to a smaller target space or a target space within a particular direction relative to the electronic device 100.

The audio transmitting module 102 may include instructions and/or logic to transmit audio from the determined speaker. For example, audio associated with an application may be transmitted from the directional speaker 103 or the non-directional speaker 104. In some cases, the audio may be transmitted with other characteristics to further control the target space. For example, an audio cone from a speaker may altered to have a larger or smaller diameter, or may be altered to send audio farther from the electronic device 100.

Figure 2:
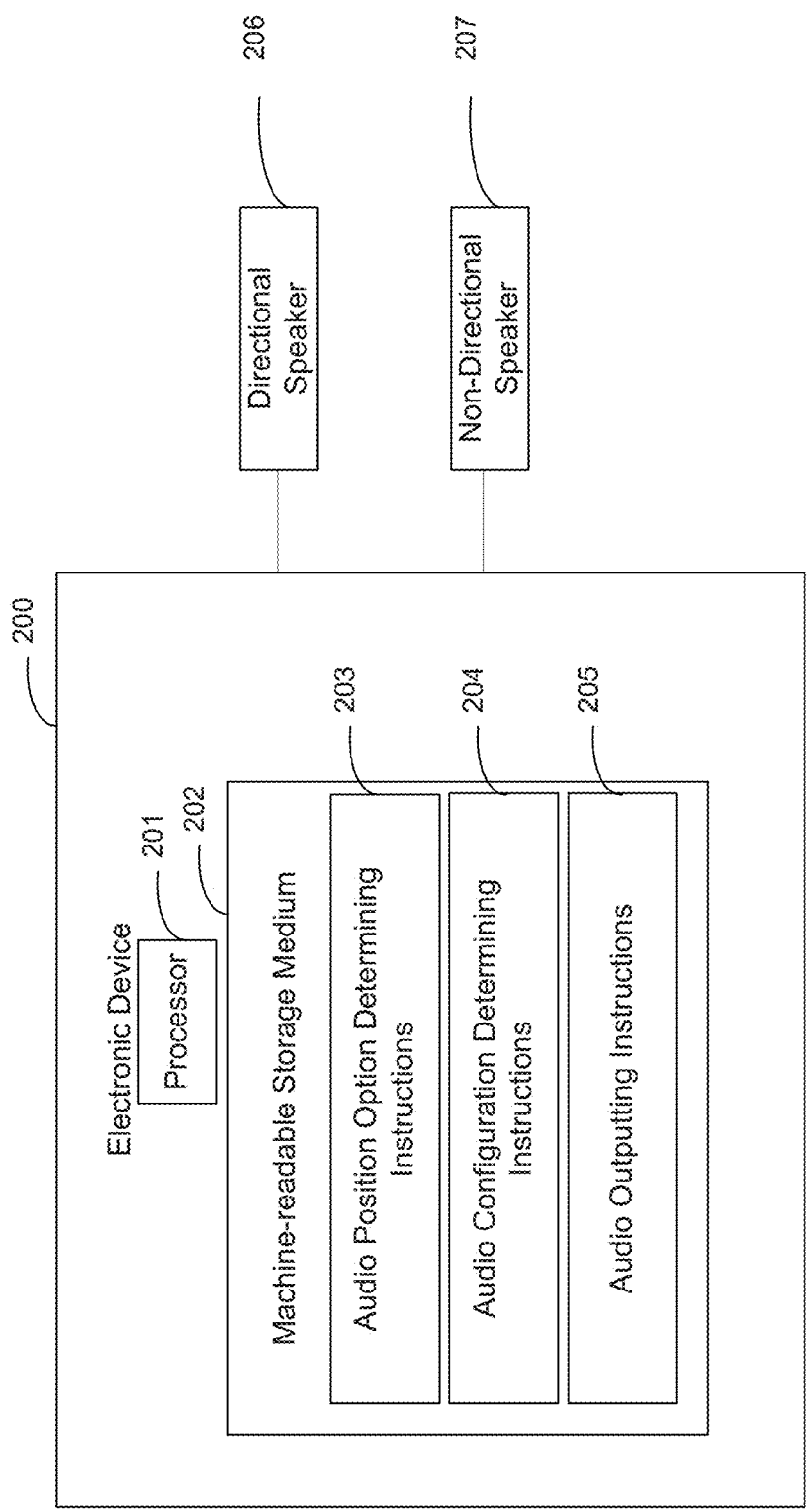
FIG. 2 is a block diagram illustrating one example of an electronic device.

FIG. 2 is a block diagram illustrating one example of an electronic device 200. The electronic device 200 may be, for example, a desktop, laptop, or mobile computing device. The electronic device 200 may include speakers for transmitting audio, such as a directional speaker 206 and a non-directional speaker 207. In one implementation, the electronic device 200 may offer a sliding scale of audio modes such that the audio may be transmitted into different target spaces. For example, a user may select a small group setting where the audio is transmitted into a limited target space in front of the electronic device 200 close to the electronic device, or the user may select a presentation setting where the audio is transmitted into a large target space surrounding the electronic device 200. In some cases, the settings may indicate different audio types, such as an individual, library, or presentation mode.

The directional speaker 206 may be a speaker for transmitting audio in a particular direction. In some cases, the electronic device 200 may include multiple directional speakers where each speaker transmits audio in a different direction from the electronic device 200. The directional speaker 207 may transmit audio such that a person outside of the audio cone in a particular transmitted by the directional speaker 206 may be unable to hear the audio. The non-directional speaker 207 may be any suitable speaker for transmitting audio. For example, the non-directional speaker 207 may be a standard speaker that transmits audio generally rather than in a specific direction.

The electronic device 200 may include a processor 201 and a machine-readable storage medium 202. The processor 201 may be any suitable processor, such as a central processing unit (CPU), a semiconductor-based microprocessor, or any other device suitable for retrieval and execution of instructions. In one implementation, the electronic device 200 includes logic instead of or in addition to the processor 201. As an alternative or in addition to fetching, decoding, and executing instructions, the processor 201 may include one or more integrated circuits (ICs) (e.g., an application specific integrated circuit (ASIC)) or other electronic circuits that comprise a plurality of electronic components for performing the functionality described below. In one implementation, the electronic device 200 includes multiple processors. For example, one processor may perform some functionality and another processor may perform other functionality described below.

The machine-readable storage medium 202 may be any suitable machine readable medium, such as an electronic, magnetic, optical, or other physical storage device that stores executable instructions or other data (e.g., a hard disk drive, random access memory, flash memory, etc.). The machine-readable storage medium 202 may be, for example, a computer readable non-transitory medium. The machine-readable storage medium 202 may include instructions executable by the processor 201.

The machine-readable storage medium 202 may include audio position option determining instructions 203, audio configuration determining instructions 204, and audio outputting instructions 205. The audio position option determining instructions 203 may include instructions to determine a target space for audio transmitted from the electronic device 200. For example, a user may want the audio to be heard in one location but not in another. The target space may be a particular distance and direction relative to the electronic device 200. The option may be selected by a user. For example, the electronic device 200 may include a button for selecting an audio option. In some cases, a user interface may be displayed to a user on a display device associated with the electronic device 200, and the user may select an audio position option from the user interface. In some cases, the processor 201 may determine audio position based on information provided by a user. For example, a user may indicate an audience size or an audio use, and the processor 201 may then determine a suitable audio position.

The audio configuration determining instructions 204 may include instructions to determine an audio configuration to provide the audio position option. The configuration may involve, for example, selecting speakers for use to transmit the audio or determining how to transmit audio from speakers, such as how to alter the audio cone transmitted from a particular speaker. The configuration may involve using the directional speaker 206 or the non-directional speaker 207. For example, the processor may determine whether the directional speaker 206 or the non-directional speaker 207 should be used to achieve the desired audio position. In some cases, both the directional speaker 206 and the non-directional speaker 207 may be selected. In one implementation, the electronic device 200 includes multiple directional speakers 206, and the audio configuration determining instructions 204 include instructions for determining which of the directional speakers to use. The configuration determination may involve looking up a configuration in a storage where the configuration is associated with an audio position option.

The audio outputting instructions 205 may include instructions to output the audio according to the determined configuration. For example, the processor 201 may send the audio to the speakers. The audio may be sent to a subset of selected speakers, such as to the directional speaker 206 or the non-directional speaker 207, or may be sent to be transmitted from a speaker in a particular manner.

Figure 3:
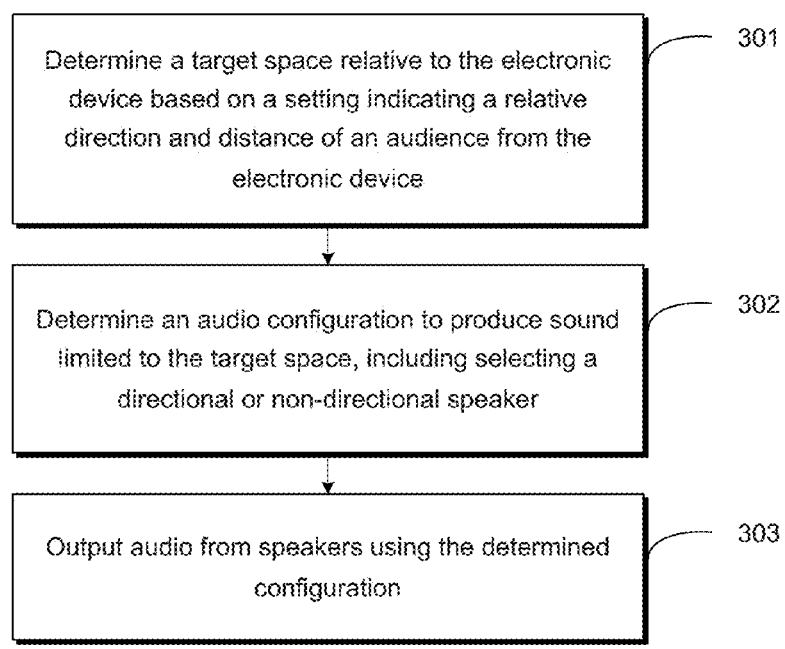
FIG. 3 is a flow chart illustrating one example of method to transmit audio within a target space.

FIG. 3 is a flow chart 300 illustrating one example of a method to transmit audio within a target space. An electronic device may transmit audio from speakers such that the audio is not heard outside of a target space, and the electronic device may offer multiple audio modes such that the target space may be updated based on the use of the electronic device. For example, a user may want to limit audio to an area where other people cannot hear it, such as where a user would like to adjust the audio so that it acts as if the user is wearing headphones. In some cases, there may be a larger audience for the audio or the user may be farther from the electronic device, in which case the target space for the audio may be larger.

In some cases, it may not be desirable to limit the area in which audio from the electronic device may be heard. For example, the target space may be the entire room containing the electronic device, such as where the audio is a presentation for the room or where a movie is being shown to the entire room. The audio may be tailored to the target space in part by switching between a directional and non-directional speaker when the target space is changed. The method may be implemented, for example, by the electronic device 100 of FIG. 1 or the electronic device 200 of FIG. 2.

Beginning at 301, a processor or logic determines a target space relative to the electronic device based on a setting indicating a relative direction and distance of an audience from the electronic device. The processor may be a CPU or other processor. The processor may be, for example, the processor 201 from FIG. 2. The target space may be any suitable area relative to the electronic device. For example, the target space may be a particular distance and direction from the electronic device. The processor may determine the target space based on a user setting indicating an audience type, such as an individual user, couples, small group, or large group settings. In some cases, the user may further enter information about the direction of the audience from the electronic device. In some implementations, the user enters information about the audience size and position relative to the electronic device, and the processor determines which audio mode is tailored to the entered characteristics. In some cases, the electronic device may determine the characteristics of the audience automatically, such as based on data from a camera.

Continuing to 302, the processor or logic determines an audio configuration to produce sound limited to the target space. Determining the audio configuration may include selecting a directional or non-directional speaker. The processor may determine the configuration in any suitable manner. In some cases, a user may select a setting and the processor looks up the appropriate configuration for the setting in a database or other storage. In some cases, the user may provide criteria to the processor, and the processor determines an audio configuration to meet the criteria.

In one implementation, the audio configuration is a hardware configuration. For example, the electronic device may include multiple speakers and determining the audio configuration may involve determining which of the speakers to use to transmit audio. The processor may determine to use a directional or non-directional speaker. In one implementation, the electronic device may include directional speakers for different directions, and the processor determines which of the directional speakers to use. The processor may also determine whether to use multiple non-directional speakers, such as where the audience is farther from the electronic device.

In one implementation, the audio configuration is a software based configuration involving how audio is transmitted from speakers. For example, audio may be transmitted in a manner such that the audio cone is smaller or larger or extends farther from the electronic device. In some cases, determining the audio configuration may involve both selecting a speaker and determining a manner of transmitting sound from the selected speaker. In some cases, the electronic device may also set an initial volume for the speakers for the audio mode where the volume is louder for an audio mode meant to reach a target space farther from the electronic device.

Proceeding to 303, the processor or logic outputs audio from speakers using the determined configuration. The processor may output audio, such as music, movie audio, or other types of audio from the determined speakers in the determined manner. As a result, the audio may be limited to a target space such that people outside of the target space may be unable to hear the audio. In some cases, an audio mode may be selected such that the target space is large enough to warrant the use of a non-directional speaker. In some cases, the audio mode capabilities may be turned off such that the non-directional speaker is used.

Figure 4A:
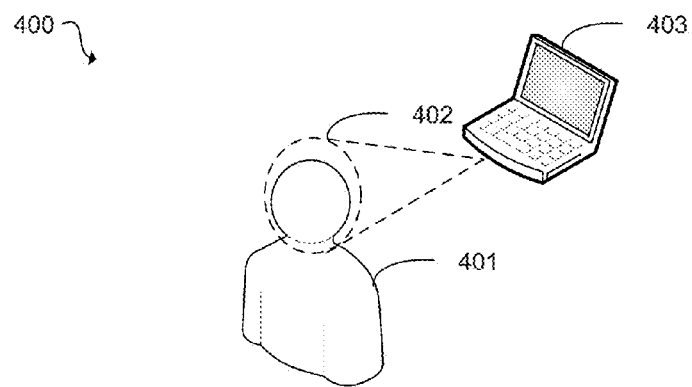
FIGS. 4A and 4B are diagrams illustrating transmitting audio within a target space using directional and non-directional speakers.
Figure 4B:
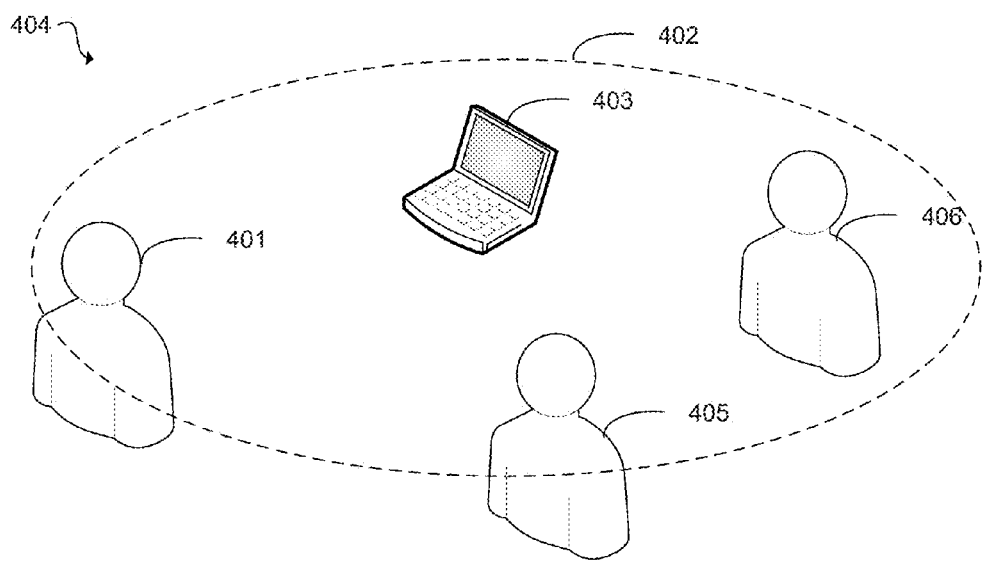

FIGS. 4A and 4B are diagrams illustrating transmitting audio within a target space using directional and non-directional speakers. FIG. 4A shows a diagram 400 of a user 401 in front of an electronic device 403. Audio cone 402 shows audio traveling from a speaker of the electronic device 403. A user may select a single user setting such that the audio may be configured to limit the audio to a single user or a small group of users such that headphones are not used. The audio cone 402 representing the travel of audio from the electronic device 403 shows that audio is transmitted such that it may be heard by the user 401, but that the audio may not be heard by people in surrounding areas outside of the audio cone 402. The audio cone 402 may be created by a directional speaker of the electronic device 403.

FIG. 4B shows a diagram 404 of an audio cone 402 surrounding the electronic device 403 such that the user 401 as well as additional users 405 and 406 may be able to hear sound from the audio cone 402. The audio cone 402 representing the travel of sound from the electronic device 403 may be created by a non-directional speaker associated with the electronic device 403. For example, a processor may determine that a different audio mode has been selected where the target space for the audio is larger and farther from the electronic device 403. The processor may determine that a non-directional speaker should be used to transmit audio to the target space associated with the selected audio mode.

Figure 5A:
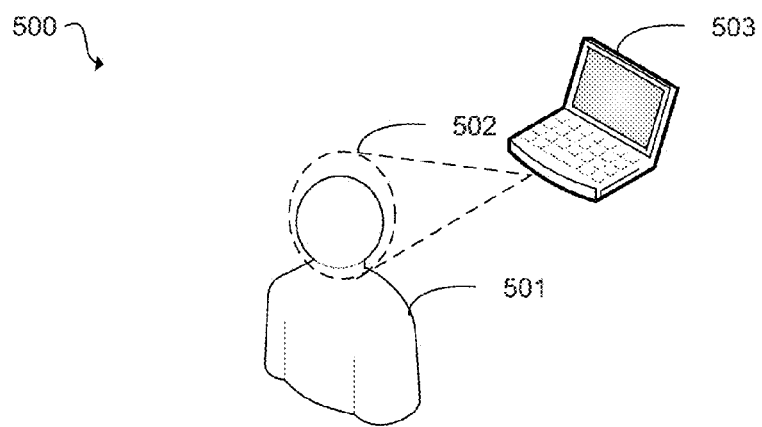
FIGS. 5A and 5B are diagrams illustrating transmitting audio within a target space in a particular direction.
Figure 5B:
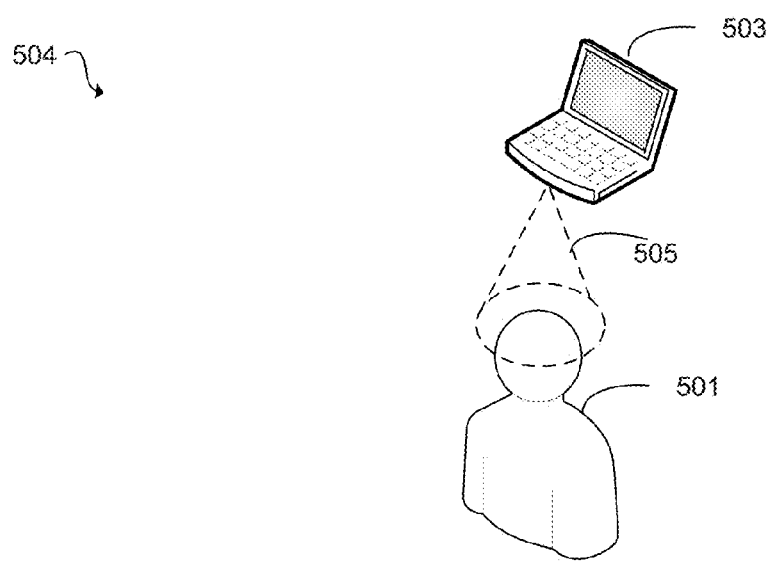

FIGS. 5A and 5B are diagrams illustrating transmitting audio within a target space in a particular direction. For example, FIG. 5A shows a diagram 500 of a user 501 of an electronic device 503. An audio cone 502 representing the travel of sound from a speaker is produced by a speaker of the electronic device 503 such that the user 501 may hear the audio. For example, the audio cone 502 may be transmitted when a user selects a headphone or individual user mode. In some cases, the user may indicate his position relative to the electronic device 503 or the electronic device 503 may sense the user's position relative to the electronic device 503. For example, the electronic device 503 may include a camera or motion sensor for sensing the position of the user.

FIG. 5B shows a diagram 504 where the user 501 has changed position relative to the electronic device 503. The electronic device 503 transmits the audio cone 505 such that the audio may be transmitted to a new target space where the user 501 is located. The change in direction may be implemented by using a different speaker associated with the electronic device 503 or by changing the method of transmitting audio from the same speaker. For example, a different directional speaker may be selected based on the new position of the user 501.

Figure 6A:
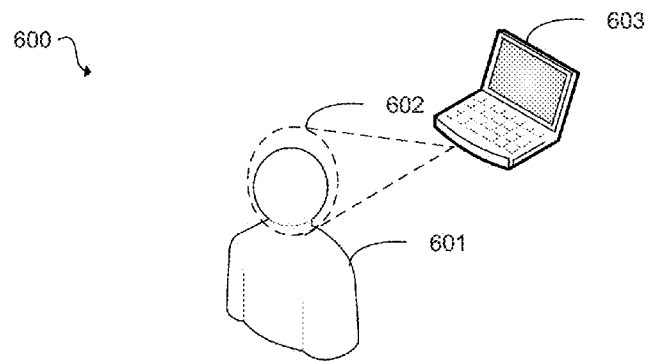
FIGS. 6A and 6B are diagrams illustrating transmitting audio within a target space tailored to an audience size.
Figure 6B:
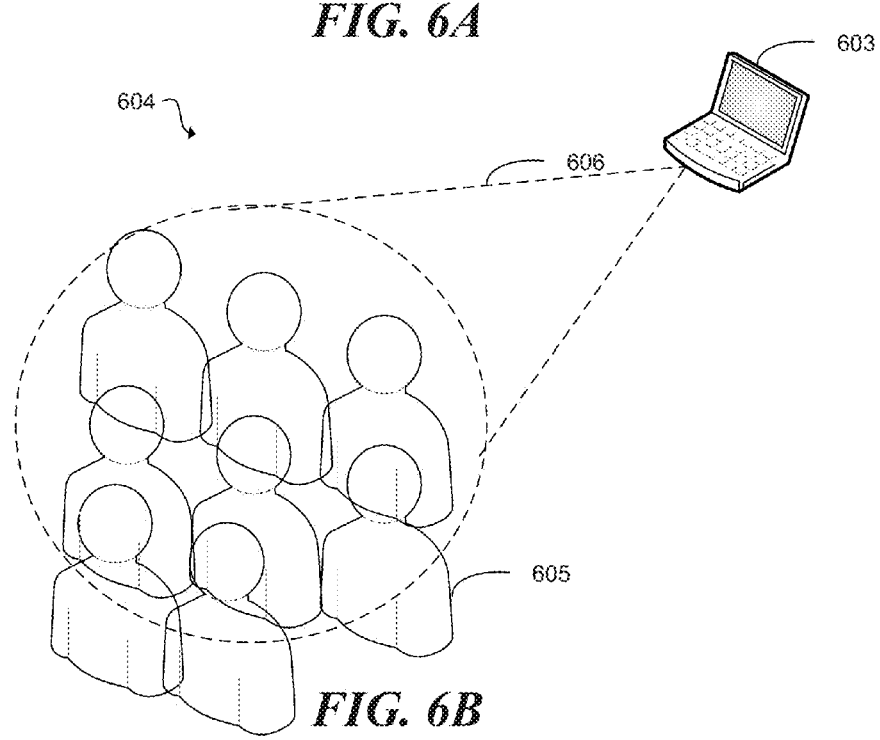

FIGS. 6A and 6B are diagrams illustrating transmitting audio within a target space tailored to an audience size. FIG. 6A shows a diagram 600 of a user 601 of an electronic device 603. The electronic device 603 transmits audio represented by audio cone 602 such that it is transmitted to a target space including the user 601. For example, an electronic device may have a setting for a user to select audio for a small audience such that the audio cone is limited in size and close to the electronic device.

FIG. 6B shows a diagram 604 of a group of users 605 where the group of users are listening to audio from the electronic device 603. The electronic device 603 may produce audio cone 606 such that the audio transmitted is within a target space appropriate for a larger audience. For example, the target space may be larger and farther from the electronic device 603. The electronic device 603 may use different speakers or a different manner of transmitting the audio than in FIG. 6B. In some cases, a non-directional speaker may be used where the audience size or target space exceeds a particular size.

Making multiple audio modes available to a user of an electronic device may improve the user experience with the electronic device. For example, a user may select an audio mode that is tailored to a particular use of the electronic device. One or more speakers and speaker settings may be automatically selected in order to transmit audio within a target space associated with the audio mode.

The invention claimed is:

1. An electronic device, comprising:
   a directional speaker;
   a non-directional speaker; and
   a processor to:
   determine a characteristic of a target audio space;
   select between the directional speaker and the non-directional speaker based on the characteristic of the target audio space;
   in response to a selection of the directional speaker, transmit audio using the directional speaker; and
   in response to a selection of the non-directional speaker, transmit audio using the non-directional speaker.

2. The electronic device of claim 1, wherein the characteristic of the target audio space is a relative position of an audience to the electronic device.

3. The electronic device of claim 2, wherein the relative position of an audience to the electronic device is specified by a setting of the electronic device.

4. The electronic device of claim 1, wherein the characteristic of the target audio space is a size of the target audio space, and wherein the processor is to determine to transmit audio from the non-directional speaker in response to a determination that the size of the target audio space is larger than a size threshold.

5. The electronic device of claim 4, wherein the processor is to determine to transmit audio from the directional speaker in response to a determination that the size of the target audio space is not larger than the size threshold.

6. The electronic device of claim 4, wherein the size threshold is specified by a user setting of the electronic device.

7. The electronic device of claim 1, wherein the characteristic of the target audio space is an audience size.

8. A method, comprising:
   determining, by a processor, a characteristic of a target audio space, the target audio space to receive for audio from an electronic device, the electronic device comprising both a directional speaker and a non-directional speaker;
   selecting, by the processor, between the directional speaker and the non-directional speaker based on the characteristic of the target audio space;
   in response to a selection of the directional speaker, outputting audio using the directional speaker; and
   in response to a selection of the non-directional speaker, outputting audio using the non-directional speaker.

9. The method of claim 8, wherein the characteristic of the target audio space is a size of the target audio space, and further comprising:
   determining, by the processor, whether the size of the target audio space is larger than a size threshold; and
   in response to a determination that the size of the target audio space is larger than a size threshold, determining, by the processor, to transmit audio from the non-directional speaker.

10. The method of claim 9, further comprising:
    in response to a determination that the size of the target audio space is not larger than the size threshold, determining, by the processor, to transmit audio from the directional speaker.

11. The method of claim 9, wherein the size threshold is specified by a user setting of the electronic device.

12. The method of claim 8, wherein the characteristic of the target audio space is an audience size.

13. The method of claim 8, wherein the characteristic of the target audio space is a relative position of an audience to the electronic device.

14. The method of claim 11, wherein the relative position of the audience to the electronic device is specified by a setting of the electronic device.

15. A non-transitory storage medium comprising instructions executable by a processor to:
    determine a characteristic of a target audio space, the target audio space to receive for audio from an electronic device, the electronic device comprising both a directional speaker and a non-directional speaker;
    select between the directional speaker and the non-directional speaker based on the characteristic of the target audio space;
    in response to a selection of the directional speaker, transmit audio using the directional speaker; and
    in response to a selection of the non-directional speaker, transmit audio using the non-directional speaker.

16. The non-transitory storage medium of claim 15, wherein the characteristic of the target audio space is a size of the target audio space, and further comprising instructions to:
    determine whether the size of the target audio space is larger than a size threshold; and
    in response to a determination that the size of the target audio space is larger than a size threshold, determine to transmit audio from the non-directional speaker.

17. The non-transitory storage medium of claim 16, further comprising instructions to:
    in response to a determination that the size of the target audio space is not larger than the size threshold, determine to transmit audio from the directional speaker.

18. The non-transitory storage medium of claim 16, wherein the size threshold is specified by a user setting of the electronic device.

19. The non-transitory storage medium of claim 15, wherein the characteristic of the target audio space is an audience size.

20. The non-transitory storage medium of claim 15, wherein the characteristic of the target audio space is a relative position of an audience to the electronic device.

* * * * *